F. P. SNOW.
VALVE.
APPLICATION FILED OCT. 31, 1910.
1,179,048.
Patented Apr. 11, 1916.
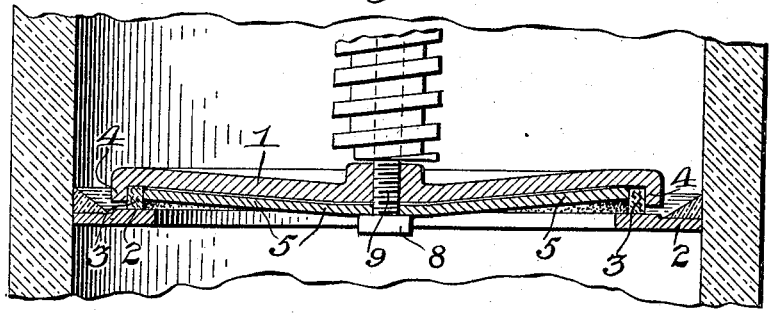
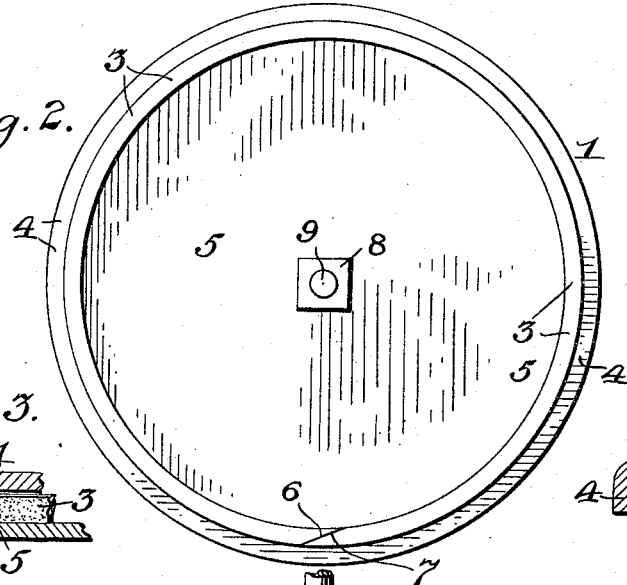
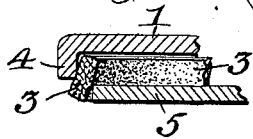
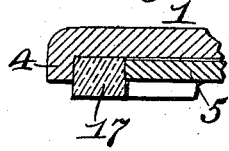
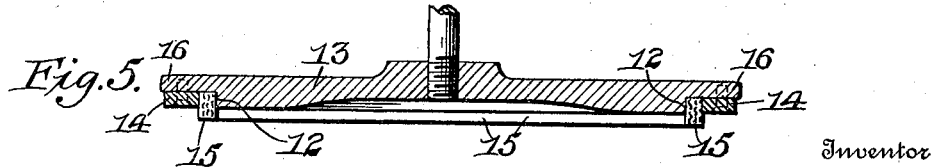
Witnesses
Bertha L. Scott.
James Pennie.
Inventor
Frank P. Snow,
By Cassell Severance.
Attorney

UNITED STATES PATENT OFFICE.

FRANK P. SNOW, OF LOS ANGELES, CALIFORNIA.

VALVE.

1,179,048.

Specification of Letters Patent. Patented Apr. 11, 1916.

Application filed October 31, 1910. Serial No. 589,896.

*To all whom it may concern:*

Be it known that I, FRANK P. SNOW, a citizen of the United States, residing at Los Angeles, in the county of Los Angeles and State of California, have invented certain new and useful Improvements in Valves, of which the following is a specification.

This invention relates to improvements in valves and particularly to that class of valves that are provided with gaskets or washers for making a tight joint with a suitable valve seat.

It is an object of the invention among other things, to provide a valve in which a gasket may be gripped in place by parts of the valve, the gasket projecting sufficiently to engage the valve seat of the valve mechanism.

It is also an object of the invention to secure the material forming the valve gasket, so that a portion of said material projects and engages the valve seat when the valve is closed, for forming a tight joint at said seat.

It is a further object of the invention to provide a valve with a suitable flange or shoulder and with means for forcing a gasket against said shoulder or flange for gripping it in place.

With these and other objects in view the invention consists of certain novel constructions, combinations and arrangements of parts as will be hereinafter fully described and claimed.

In the accompanying drawing, forming a part of this specification:—Figure 1 is a central sectional view through a valve and its seat, constructed in accordance with the present invention. Fig. 2, is a face plan view of the valve proper, showing the gasket gripped in place. Fig. 3, is a detail fragmentary sectional view of a portion of the valve showing the gasket gripping piece about to be forced in place to pinch and grip the said gasket. Fig. 4, is a central sectional view through a valve having a modified form of gasket gripping plate. Fig. 5, is a similar sectional view but showing an outside gripping ring for clamping the gasket in position against a shoulder upon the valve. Fig. 6, is a fragmentary sectional view through the edge portion of the valve showing a different form of gasket from those illustrated in the other views.

The present invention is designed to provide a valve which is adapted to press a gasket or washer suitably mounted thereon, against a valve seat for making a tight joint. In the drawing a preferred form of valve mechanism has been shown to illustrate the invention and it will now be described more particularly, reference being had to said drawing.

In the said drawing, 1 indicates a valve, 2 a valve seat and 3 a gasket or packing strip. The valve 1 is preferably made in the form of a plate or head, usually circular in shape, the said plate being provided with a shoulder or flange, against which the gasket or packing strip is pressed. In the preferred form of valve the shoulder is formed by providing a flange or projection as 4, which is generally located at the edge of the valve 1. The gasket 3 is usually formed of a strip of suitable material and preferably of rubber fabric, such as is commonly employed for washers, gaskets and liquid excluding or holding means generally. As shown in the drawing the said gasket 3 is usually made of rubber fabric of any desired thickness and a strip of this material is set on edge against the shoulder or flange 4, so that the woven basic material embedded in the rubber of the gasket, extends through to the edge of the said gasket, so as to touch the valve seat 2 and firmly protect and hold the rubber in place and thus prevent the same from chipping or flaking off.

The gasket is gripped in position by employing a gripping member of suitable form which is so arranged as to force the strip of the gasket against the flange or shoulder 4 of the valve 1. As shown in Figs. 1, 2 and 3 the gripping member is preferably a plate as 5, which is of such a size as to come within the flange 4, when applied to the valve 1. The diameter of the plate 5 is however slightly larger than the diameter of the space within the gasket strip, when it is first set in place within the shoulder 4. As will be apparent from Fig. 3, the gasket is somewhat thicker than the space between the plate 5 and the flange or shoulder 4, so that when the plate 5 is forced upwardly against the valve 1, the gasket will be tightly pinched or gripped into position against the shoulder 4. The slightly yielding character of the gasket material, permits of the forcing of the gripping plate into place for securing the said gasket against the flange or shoulder 4. In this manner the gasket 3 is very tightly fastened in position on the face of the valve 1 and its free face, which may be allowed to extend somewhat beyond the flange 4 and the face of the gripping plate 5, can be brought firmly against the valve seat 2, for making a tight joint therewith, when the valve is closed. There are many instances in the use of valves of all kinds, when it is desirable to employ a rubber fabric for the gasket, and when the side facing surfaces thereof are brought against metallic valve seats, the rubber of such faces frequently flakes off, so that the seating of the valve becomes imperfect, and leakage occurs. This commonly happens when iron valve seats are used and rust forms thereon so that the rubber of the fabric adheres thereto, especially when the valve is closed for long periods. The mounting of the gasket as in the present invention, where the edge of the rubber fabric, instead of the side faces thereof, may be made to engage the valve seat, the woven web or fabric portion of the material extends through to the seat engaging edge and is found in practice, to prevent the pulling or flaking off of portions of the rubber, even when the valve seat has become rusty.

In arranging the gasket in position, the ends thereof, as 6 and 7 are fitted upon each other, the said ends being usually cut at an angle to the faces of the gasket material, so as to lap upon each other, as clearly indicated in Fig. 2, of the drawing. When the plate 5 is brought within the circle of the gasket it first tends to flare it outwardly somewhat as indicated in Fig. 3, but when it is forced into place the gasket will be gripped in perpendicular relation to the valve 1 and the valve seat 2.

The plate 5 is generally held in place by means of a nut 8 applied upon the threaded end of a bolt 9 passed through the valve and valve stem.

As shown in Fig. 4, a narrow plate or ring 10, may be employed for gripping the gasket in position, instead of the plate 5. In this instance the said ring is fastened to the body portion of the valve by screws or rivets as 11. The ring 10 however crowds the gasket material against the flange or shoulder of the valve and grips it in place, because of its relative size, with respect to the area within the gasket and the flange.

As illustrated in Fig. 5, the shoulder as 12 upon the valve 13 may be made to face outwardly and the gripping plate as 14 be arranged outside with a space between for the gasket 15. In this instance the opening in the plate 14 is made slightly smaller than the outer diameter of the gasket so that the gasket will be squeezed tightly between the said plate 14 and the shoulder 12 for gripping the said gasket in place. The plate 14 is secured to the projecting flange 16 of the valve in any desired manner, as for instance by screws or rivets.

As illustrated in Fig. 6, the gasket may be made of material formed wider than it is deep as at 17, without departing in the least from the spirit of the invention. The material also may be something aside from rubber or rubber fabric, as for instance leather, fiber or anything else suitable for making a close joint for a valve, all within the spirit and scope of the invention. It will also be understood that the form and shape of the valve may be varied so that it may be circular, oval, or rectangular in contour, and the shape of the gasket and gripping plate may also be varied, to adapt them to the form of valve used and to the shape of the valve seat. The gasket or packing material may also be applied to either side of the valve, according to the manner in which the valve is to be seated, all within the scope of the invention.

Having now described the invention what is claimed as new and is desired to be secured by Letters Patent, is:—

1. A seat engaging valve comprising a flanged plate, a gasket of rubber fabric set upon edge against said flange whereby the textile, woven portion of the fabric extends through to the seat engaging edge of the gasket and a plate clamped upon the valve within the gasket strip for spreading it against the said flange and thus gripping it in place.

2. In combination with a valve seat, a valve comprising a flanged plate, a textile rubber strip coiled against said flange and having its end portions lapped, completing a seat engaging gasket for the valve and a plate clamped against the valve and of suitable diameter to squeeze and grip the gasket against the flange, the gasket edge projecting beyond the said flange and plate for making a tight joint with the valve seat.

3. A valve adapted to engage a valve seat with its face surface, and having a gasket groove formed with a fixed wall and a movable wall, means for securing the movable wall in place after it has been forced against the gasket, and a rubber gasket fitting in said groove edgewise, and having textile reinforcing means incorporated in its material and extending to the seat engaging edge of the gasket for preventing its flaking off.

4. A valve having a gasket engaging projection and a gasket holding member adapted to be brought one within the other in the same plane, with a gasket receiving space between their gripping edges, a gasket adapted to be received in said space and to project therefrom upon one side of the valve, the gasket holding member and the valve with its gasket engaging projection when forced into place to grip the gasket, being held with respect to each other by their engagement with the gasket.

In testimony whereof, I have hereunto set my hand, in presence of two witnesses.

FRANK P. SNOW.

Witnesses:
EDNA B. ROLLINS,
JAMES PENNIE.

Copies of this patent may be obtained for five cents each, by addressing the "Commissioner of Patents, Washington, D. C."